United States Patent
Yen et al.

(10) Patent No.: US 10,712,609 B1
(45) Date of Patent: Jul. 14, 2020

(54) LIQUID CRYSTAL DISPLAY AND TERMINAL

(71) Applicant: BEIJING XIAOMI MOBILE SOFTWARE CO., LTD., Beijing (CN)

(72) Inventors: Chiafu Yen, Beijing (CN); Jianglin Gu, Beijing (CN); Yajun Pan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/838,019

(22) Filed: Apr. 1, 2020

(30) Foreign Application Priority Data

Apr. 10, 2019 (CN) .......................... 2019 1 0284437

(51) Int. Cl.
*G02F 1/13357* (2006.01)
*G02F 1/125* (2006.01)
*H04M 1/02* (2006.01)

(52) U.S. Cl.
CPC .. *G02F 1/133602* (2013.01); *G02F 1/133615* (2013.01); *H04M 1/0264* (2013.01)

(58) Field of Classification Search
CPC ........ G02F 1/133615; G02F 1/133602; H04M 1/0264
USPC ...................................................... 362/97.1
See application file for complete search history.

(56) References Cited

U.S. PATENT DOCUMENTS

| | | | | |
|---|---|---|---|---|
| 2011/0234940 | A1* | 9/2011 | Ishinagawa | G02F 1/133615 349/62 |
| 2017/0059771 | A1* | 3/2017 | Yuki | G02B 6/0088 |
| 2017/0336553 | A1* | 11/2017 | Yuki | G02B 6/0031 |
| 2019/0072822 | A1* | 3/2019 | Yasunaga | G02F 1/133603 |
| 2019/0302527 | A1* | 10/2019 | Cheng | H01L 51/524 |

* cited by examiner

*Primary Examiner* — Karabi Guharay
(74) *Attorney, Agent, or Firm* — Syncoda LLC; Feng Ma (57) ABSTRACT

A liquid crystal display includes: a liquid crystal module; a backlight member arranged under the liquid crystal module and having a first through hole; a light guide member arranged in the first through hole and having a second through hole, the light guide member including a light incident surface and a first light emergent surface on a wall surrounding the second through hole, the first light emergent surface being obliquely arranged towards the liquid crystal module; and a light emission member arranged opposing the light incident surface and configured to emit light into the light guide member therethrough. A part of the light entering the light guide member is projected on a portion of the liquid crystal module corresponding to a center area of the first through hole after being emitted from the first light emergent surface.

20 Claims, 3 Drawing Sheets

LIQUID CRYSTAL DISPLAY AND TERMINAL

CROSS-REFERENCE TO RELATED APPLICATION

This application claims priority to Chinese Patent Application No. 201910284437.5 filed on Apr. 10, 2019, the disclosure of which is hereby incorporated by reference in its entirety.

BACKGROUND

In recent years, a high screen-to-body ratio of a liquid crystal display (LCD) is a new trend in the development of smart terminals. However, a front camera is also provided in the smart terminal. In order to ensure the image-capturing function of the front camera, a through hole is usually formed in a backlight member of the liquid crystal display.

SUMMARY

The present disclosure relates generally to a field of display technologies, and more specifically to a liquid crystal display and a terminal.

In an aspect, embodiments of the present disclosure provide a liquid crystal display. The liquid crystal display includes: a liquid crystal module; a backlight member arranged under the liquid crystal module and having a first through hole; a light guide member arranged in the first through hole and having a second through hole, the light guide member including a light incident surface and a first light emergent surface on a hole wall surrounding the second through hole, and the first light emergent surface being obliquely arranged towards the liquid crystal module; and a light emission member arranged opposing the light incident surface and configured to emit light into the light guide member through the light incident surface. A part of the light entering the light guide member is projected on a part of the liquid crystal module corresponding to a center area of the first through hole after being emitted from the first light emergent surface.

In another aspect, embodiments of the present disclosure provide a terminal. The terminal includes: a camera and a liquid crystal display. The liquid crystal display includes: a liquid crystal module; a backlight member arranged under the liquid crystal module and having a first through hole; a light guide member arranged in the first through hole and having a second through hole, the light guide member including a light incident surface and a first light emergent surface on a hole wall surrounding the second through hole, and the first light emergent surface being obliquely arranged towards the liquid crystal module; and a light emission member arranged opposing the light incident surface and configured to emit light into the light guide member through the light incident surface. A part of the light entering the light guide member is projected on a part of the liquid crystal module corresponding to a center area of the first through hole after being emitted from the first light emergent surface. The camera is arranged in the second through hole of the light guide member, and the hole wall surrounding the second through hole is arranged outside a field of view of the camera.

It should be understood that the foregoing general description and the detailed description below are illustrative and exemplary and cannot be construed to limit the present disclosure.

BRIEF DESCRIPTION OF THE DRAWINGS

Embodiments of the present disclosure will be described by means of examples with reference to the drawings. In the drawings, same or similar reference numerals represent same or similar elements.

DETAILED DESCRIPTION

Embodiments of the present disclosure will be described in detail below with reference to the accompanying drawings. Although some embodiments of the present disclosure are illustrated in the accompanying drawings, it should be understood that the present disclosure may be achieved in various forms and should not be construed as a limitation to embodiments described herein. On the contrary, these embodiments provided herein are for a thoroughly and fully understanding of the present disclosure. It should be understood that, the accompanying drawings and embodiments of the present disclosure are merely considered to be illustrative, and are not intended to limit the scope of the present disclosure.

Terms "include/comprise" and their variants used herein mean open including/comprising, i.e., "including/comprising but not limited to." The term "based on" means "at least partially based on." The term "an embodiment" refers to "at least one embodiment." The term "another embodiment" refers to "at least one other embodiment." Relative definitions of other terms are given in the following descriptions.

Figure 1:
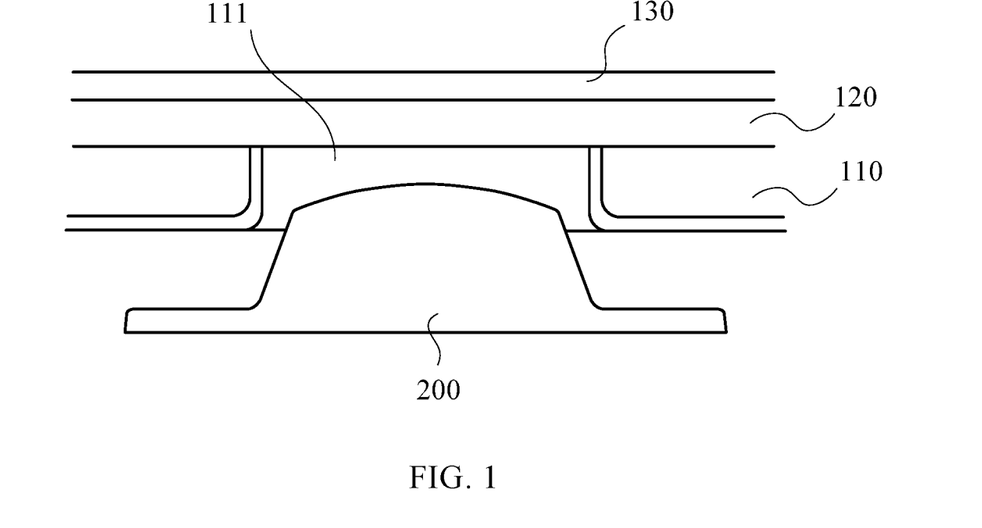
FIG. 1 is a schematic view of a portion of a liquid crystal display.

A liquid crystal display (LCD) is a common display screen in an smart terminal. As illustrated in FIG. 1, the liquid crystal display usually includes a backlight member 110, a liquid crystal module 120, and a screen cover plate 130 successively stacked. It should be noted that, in the following descriptions, a side of the liquid crystal display facing the screen cover plate 130 is up, and a side of the liquid crystal display facing the backlight member 110 is down.

The backlight member 110 provides a light source for the liquid crystal display and includes a backlight plate facing the liquid crystal module 120 and a backlight source on a side of the backlight plate. The backlight source is used for emitting light, and the backlight plate is used for guiding the light emitted from the backlight source evenly to the liquid crystal module 120.

The liquid crystal module 120 includes a liquid crystal layer and an electrode assembly arranged above and below the liquid crystal layer. For example, a part of the electrode assembly is arranged above the liquid crystal layer, and another part of the electrode assembly is arranged below the liquid crystal layer. The electrode assembly is used for applying an electric field to the liquid crystal layer, and the liquid crystal in the liquid crystal layer deflects under the action of the electric field. The amount of light passing through the liquid crystal layer depends on the deflection extend of the liquid crystal. Thus, the display effect with different brightness can be realized by controlling the liquid crystal deflection in different areas of the liquid crystal layer with the electrode assembly, thereby achieving an image display function.

The screen cover plate 130 is a protective layer of the liquid crystal display and is usually selected from a glass cover plate, a transparent resin cover plate, etc.

Typically, in order to ensure the image capturing function of the front camera, a through hole 111 is formed in the backlight plate of the backlight member 110 of the liquid crystal display. A camera 200 is arranged corresponding to the through hole 111, and realizes the image capturing function by acquiring the light incident through the through hole 111. In this way, the light emitted from the backlight source cannot be guided through the through hole 111 in the backlight member 110. That is, there is no backlight existing at a portion of the liquid crystal display corresponding to the through hole 111. Thus, in a traditional technical solution, the portion of the liquid crystal display corresponding to the through hole 111 cannot display the image, such that the display effect, especially the display effect of a full screen, will be affected.

That is, an area of the liquid crystal display corresponding to the front camera cannot display an image, as the through hole in the backlight member cannot emit light, thereby destroying the display integration and further affecting the display effect of the liquid crystal display.

In order to achieve a full-screen display effect, some solutions change the front camera part into a pop-up structure or other forms by means of hardware structures. However, this kind of technology has a sacrifice in many aspects, such as a cost, a production process or a user experience, etc.

Various embodiments of the present disclosure provide a liquid crystal display and a terminal that can address the problems in related technologies.

Figure 2:
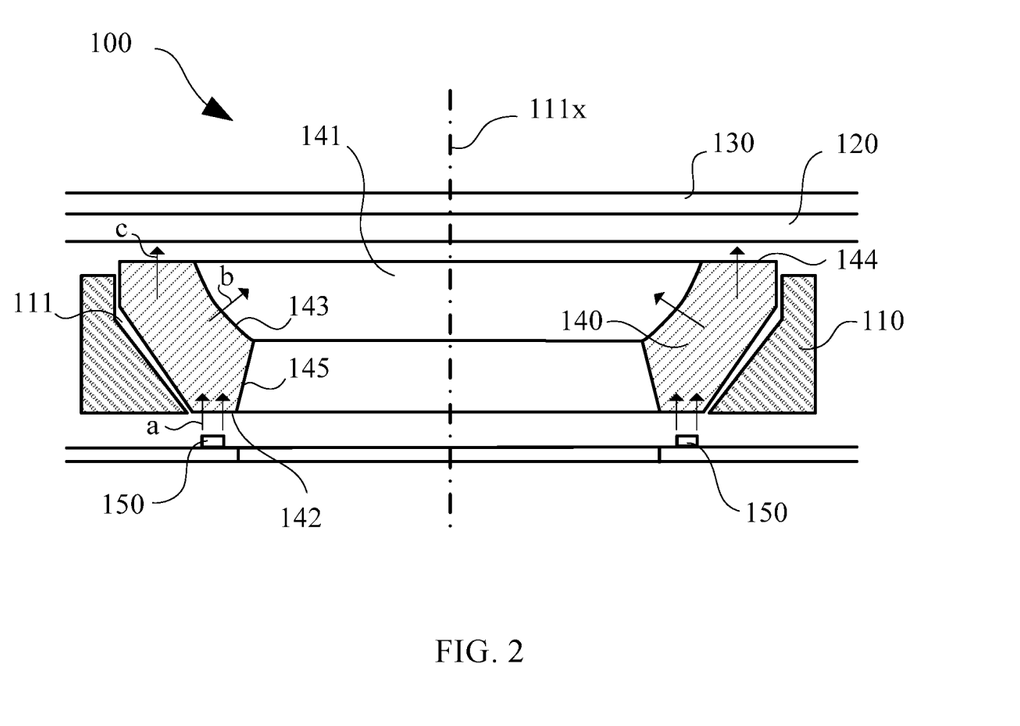
FIG. 2 is a schematic view of a liquid crystal display according to an embodiment of the present disclosure.
Figure 3:
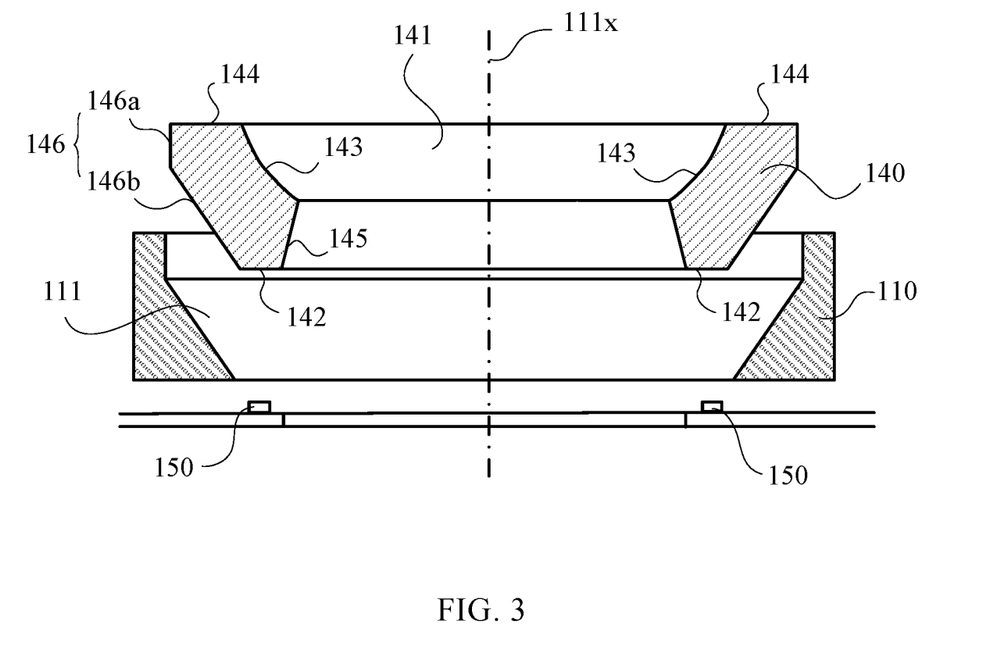
FIG. 3 is an assembly view of a light guide member and a backlight member in a liquid crystal display according to an embodiment of the present disclosure.
Figure 4:
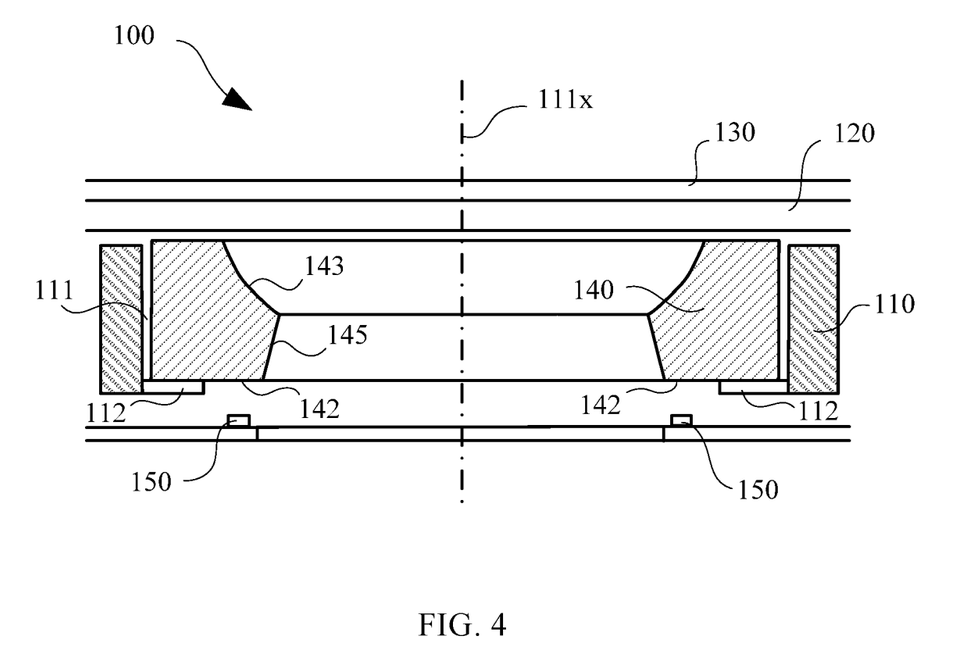
FIG. 4 is a schematic view of a liquid crystal display according to another embodiment of the present disclosure.
Figure 5:
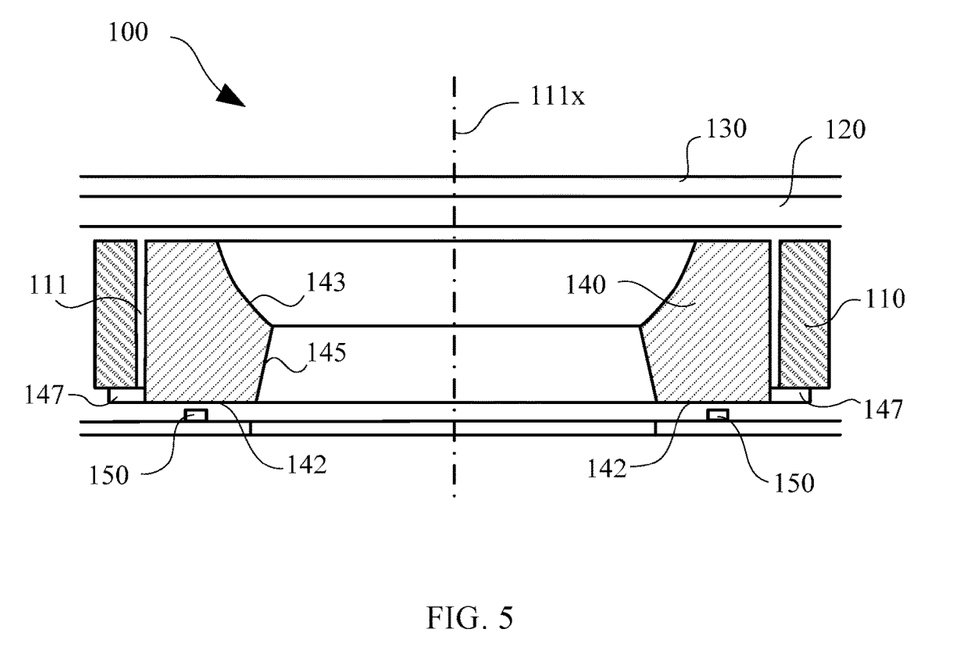
FIG. 5 is a schematic view of a liquid crystal display according to yet another embodiment of the present disclosure.

FIG. 2, FIG. 4 and FIG. 5 are schematic views of a liquid crystal display illustrated according to different embodiments; FIG. 3 is an assembly view of a partial assembly in the liquid crystal display illustrated in FIG. 2.

As illustrated in FIGS. 2 to 5, various embodiments of the present disclosure provide a liquid crystal display 100. The liquid crystal display 100 includes a liquid crystal module 120, a backlight member 110, a light guide member 140 and a light emission member 150. The backlight member 110 is arranged below the liquid crystal module 120 and has a first through hole 111. The light guide member 140 is arranged in the first through hole 111 and has a second through hole 141.

The light guide member 140 includes a light incident surface 142 and a first light emergent surface 143 arranged on a hole wall surrounding the second through hole 141, and the first light emergent surface 143 is arranged obliquely towards the liquid crystal module 120. In some embodiments, the first light emergent surface 143 may be defined by a part of the hole wall surrounding the second through hole 141.

The light emission member 150 is arranged corresponding to the light incident surface 142, and the light emitted from the light emission member 150 (such as light beam "a" illustrated in FIG. 2) enters the light guide member 140 through the light incident surface 142. A part of the light (such as light beam "b" illustrated in FIG. 2) entering the light guide member 140 is projected on the liquid crystal module 120 corresponding to the first through hole 111 after being emitted from the first light emergent surface 143.

In this way, for example, various embodiments of the present disclosure allow the light emitted from the first light emergent surface 143 to be projected on the liquid crystal module 120 corresponding to the first through hole 111. Thus, for example, the liquid crystal in the liquid crystal layer may be reversed under the control of the electrode assembly in the liquid crystal module 120, such that the area of the liquid crystal display 100 corresponding to the first through hole 111 can realize the image display, which optimizes the display integrity of the liquid crystal display provided in the embodiments of the present disclosure and helps to achieve a full-screen display effect.

In an embodiment, the light guide member 140 also includes a second light emergent surface 144 located on an upper end surface of the light guide member 140, and the second light emergent surface 144 is connected with an upper end edge of the first light emergent surface 143.

In this way, a part of the light emitted from the light emission member 150 into the light guide member 140 is irradiated on the first light emergent surface 143, and another part thereof is irradiated on the second light emergent surface 144. Thus, in the light entering the light guide member 140, the light irradiated on the first light emergent surface 143 (such as the light beam "b" illustrated in FIG. 2) can be projected on the liquid crystal module 120 corresponding to the first through hole 111 after being emitted from the first light emergent surface 143, and the light irradiated on the second light emergent surface 144 (such as the light c illustrated in FIG. 2) can also be projected on the liquid crystal module 120 corresponding to the first through hole 111 after being emitted from the second light emergent surface 144. Therefore, the light guide member 140 may be used to provide the backlight source for the liquid crystal module 120 corresponding to the first through hole 111, so as to achieve a full-screen effect of the liquid crystal display.

In some embodiments, in the light emitted into the light guide member 140 from the light emission member 150, a part of the light (such as the light beam "b" illustrated in FIG. 2) may be irradiated on an area (i.e., a center area) of the light guide member 140 close to the second through hole 141, and another part of the light (such as the light c illustrated in FIG. 2) may be irradiated on an area (i.e., an edge area) of the light guide member 140 away from the second through hole 141. In other words, the light emitted from the first light emergent surface 143 may be projected on a part of the liquid crystal module 120 corresponding to a center area of the first through hole 111, while the light emitted from the second light emergent surface 144 may be projected on another part of the liquid crystal module 120 corresponding to an edge area of the first through hole 111. In this way, the light guide member 140 may be used to provide a better backlight source for the liquid crystal module 120 corresponding to the first through hole 111, so as to achieve the full-screen effect of the liquid crystal display.

In an embodiment, the upper end surface of the light guide member 140 may protrude out of the first through hole 111. In some embodiments, the second light emergent surface 144 may be arranged to protrude out of the first through hole 111. In this way, the first light emergent surface 143 and the second light emergent surface 144 of the light guide member may be closer to the liquid crystal module 120, so as to better guide the light emitted from the light emission member 150 onto the liquid crystal module 120 corresponding to the first through hole 111. In this case, the light guide directivity of the light guide member 140 can be enhanced, and hence more light is projected on the liquid crystal module 120 corresponding to the first through hole 111.

In an embodiment, the first through hole 111 has a first axis 111x, and the second through hole 141 has a second axis coinciding with the first axis 111x.

In this way, for example, embodiments of the present disclosure allow the backlight member and the light guide member to be mounted along the same axis, thereby facilitating the processing and mounting of the overall structure of the liquid crystal display.

In an embodiment, a distance between the first light emergent surface 143 and the second axis increases gradually in a direction towards the liquid crystal module 120 along the second axis.

In this way, for example, embodiments of the present disclosure allow the light emitted from the first light emergent surface to be evenly projected on the liquid crystal module corresponding to the first through hole.

In an embodiment, the first light emergent surface 143 may be a annular surface or a bowl-shaped surface, and thus the light can be fully converged to a center area above the first through hole 111 by means of the light guide member 140, thereby providing a backlight source with a sufficient light intensity for the liquid crystal display 100 corresponding to the first through hole 111.

In an embodiment, the first light emergent surface 143 may be an inwardly concave curved surface, and a part of the light guide member 140 may form a concave lens through the inwardly concave first light emergent surface 143. The light emitted from the first light emergent surface 143 may be evenly projected on the liquid crystal module 120 corresponding to the first through hole 111 by using the spectroscopic effect of the concave lens. In addition, the light dispersion degree can also be optimized through the inwardly concave curved surface, such that the light emitted from the light emission member 150 is more evenly projected on the liquid crystal module 120 corresponding to the first through hole 111 after passing through the light guide member 140.

In some embodiments, the first light emergent surface 143 may be a curved surface with a variable curvature (such as an ellipsoidal arc surface), so as to achieve different light dispersion effects at different positions of the first light emergent surface 143. For example, the first light emergent surface 143 may be a curved surface with a fixed radius (such as a spherical arc surface), so as to facilitate processing and manufacturing.

In an embodiment, the second light emergent surface 144 of the light guide member 140 is perpendicular to the second axis and extends to an edge of the first through hole 111. In this way, the light emitted from the second light emergent surface 144 can be projected on the liquid crystal module 120 above the second light emergent surface 144, so as to provide the backlight for the part of the liquid crystal module 120 corresponding to the edge area of the first through hole 111.

Moreover, in this way, the light emitted from the light guide member 140 may be projected on the liquid crystal module 120 corresponding to the first through hole 111 as far as possible. In this case, the light guide member 140 may be used to provide an even backlight for the liquid crystal display 100 corresponding to the first through hole 111, thereby avoiding a dark annular area caused by an uneven light intensity distribution, so as to optimize the display effect of the liquid crystal display 100.

In an embodiment, the light emission member 150 is arranged below the light guide member 140, and the light incident surface 142 is located on a lower end surface of the light guide member 140. As a result, the light emitted from the light emission member 150 is directly transmitted upward into the light guide member 140. In this way, for example, a mounting position of the light emission member can be convenient, and the overall structure of the liquid crystal display can be easily processed.

In some embodiments, the light guide member 140 includes an annular light incident surface 142, and the liquid crystal display 100 includes at least two light emission members 150 to provide sufficient light. For example, the at least two light emission members 150 are arranged below the light guide member 140 and distributed in a circumferential direction of the annular light incident surface 142. In some embodiments, the at least two light emission members 150 are evenly distributed. For example, the at least two light emission members may be distributed along the circumferential direction of the annular light incident surface 142, which provides a relatively even backlight source, thus optimizing the display effect of the liquid crystal display.

In some embodiments, a rugged texture structure is provided on the light incident surface 142, such that the light emitted from the light emission member 150 may be transmitted into the light guide member 140 in different directions through the texture structure.

In some embodiments, as for the type of the light emission device 150, the light emission device 150 includes at least one selected from a light emitting diode (such as a mini light emitting diode), a light emitting diode array (such as a mini light emitting diode array), a micro light emitting diode (micro LED) and a micro light emitting diode array.

In some embodiments, as for the mounting manner of the light emission member 150, an annular support is arranged below the light guide member 140, and the annular support may be coaxially arranged with the light guide member 140. In this case, the light emission member 150 may be fixed to the annular support. In some embodiments, the light emission member 150 may be fixed directly to a module (such as a camera) fitted with the liquid crystal display 100.

In an embodiment, the light guide member 140 also includes a relief surface 145 arranged on a hole wall surrounding the second through hole 141 and below the first light emergent surface 143. In this way, the structure of the relief surface 145 may be used to facilitate the fit of the liquid crystal display 100 and other functional modules (such as a camera).

In some embodiments, the relief surface 145 may be defined by a part of the hole wall surrounding the second through hole 141. For example, the relief surface 145 is an annular surface or an inverted bowl-shaped surface whose upper end edge is connected to a lower end edge of the first light emergent surface 143.

In some embodiments, the relief surface 145 may be obliquely arranged towards a lower part of the second through hole 141. In this way, the fit degree between the liquid crystal display and the other functional modules (such as the camera) can be improved, so as to enhance the fit tightness of the liquid crystal display and the other functional modules.

In the embodiment illustrated in FIG. 2, a distance between the relief surface 145 and the second axis increases gradually from top to bottom along the second axis. In some embodiments, the camera usually has an inclined outer wall, when the liquid crystal display 100 is fitted with the camera, the relief surface 145 may be arranged corresponding to the outer wall of the camera, hence improving the tightness of the assembled structure of the camera and the liquid crystal display.

In an embodiment, an optical isolation layer is arranged between an outer wall 146 of the light guide member 140 and a hole wall surrounding the first through hole 111. The light guide member 140 and the backlight member 110 are optically isolated by means of the optical isolation layer to avoid the light in the backlight member from entering the light guide member, thus optimizing the display controllability of the liquid crystal display. For example, the interaction between the light in the backlight member 110 and the light in the light guide member 140 can be avoided to ensure that the backlight source in the backlight member 110 and the light emitted from the light emission member 150 are independent and controllable.

In some embodiments, the optical isolation layer may be a light shielding film coated on the outer wall 146 of the light guide member 140 and/or the hole wall surrounding the first through hole 111; or the optical isolation layer may be a light shielding sheet sandwiched between the light guide member 140 and the first through hole 111.

In an embodiment of the present disclosure, the material of the light guide member 140 is not limited. For example, the material of the light guide member 140 may be glass, transparent resin, etc.

As for the mounting manner of the light guide member 140 and the backlight member 110, some embodiments will be described below with reference to FIGS. 3-5.

As illustrated in FIG. 3, in an embodiment, the hole wall surrounding the first through hole 111 may include a vertical wall at an upper end of the first through hole 111. Accordingly, the outer wall 146 of the light guide member 140 includes a first portion 146a fitted with the vertical wall, i.e. the first portion 146a is the outer wall arranged vertically. In this way, when the light guide member 140 is mounted in the first through hole 111, the first portion 146a plays a guiding role for convenience of operations.

In addition, by means of the first portion 146a arranged vertically, the height of the light guide member 140 is increased while the outer diameter of the light guide member 140 can be prevented from being enlarged. The increase of the height of the light guide member 140 helps to extend the coverage range of the first light emergent surface 143, thereby projecting as much light as possible on the first through hole 111 corresponding to the liquid crystal module 120, thus further optimizing the display effect of the liquid crystal display 100.

Further as illustrated in FIG. 3, the hole wall surrounding the first through hole 111 also includes an inclined wall (such as an oblique wall inclined downwards) below the vertical wall. Accordingly, the outer wall 146 of the light guide member also includes a second portion 146b fitted with the inclined wall. The fit between the inclined wall surrounding the first through hole 111 and the second portion 146b has a position limiting function for the light guide member 140, thus not only avoiding the light guide member 140 from dropping downwards from the backlight member 110, but also facilitating the assembling of the light guide member 140 and the backlight member 110. In some embodiments, a distance between the inclined wall and the first axis decreases gradually in a direction toward a lower part of the first through hole 111 along the first axis. For example, an inner diameter of the first through hole 111 may be gradually decreased from top to bottom (e.g., in the direction towards the lower part of the first through hole 111).

As illustrated in FIG. 4, in another embodiment, the backlight member 110 includes a first support base 112 configured to carry the light guide member 140, and the first support base 112 extends from the hole wall surrounding a bottom of the first through hole 111 towards an interior of the first through hole 111. In this way, when the light guide member 140 is mounted on the backlight member 110, the light guide member 140 mounted in the first through hole 111 can be carried by the first support base 112. Moreover, the arrangement that the first support base 112 is fitted with the light guide member 140 ensures the mounting stability. The light guide member 140 may be inserted into the first through hole 111 from top to bottom during assembling.

Generally, a fixed assembly (such as a metal frame) is provided at an edge of the backlight member 110, especially at an edge of the first through hole 111. Therefore, in some embodiments, the first support base 112 may be a part of the fixed assembly (for example, the first support base 112 is fixedly connected with or is integrally molded with the metal frame). In this way, the processing is easy and the yield is high.

As illustrated in FIG. 5, in yet another embodiment, the light guide member 140 also includes a second support base 147 which is in contact with the bottom of the backlight member 110, and the second support base 147 protrudes outwards from the outer wall of the bottom of the light guide member 140. In this way, when the light guide member 140 is mounted to the backlight member 110, the light guide member 140 may be connected with an area around the first through hole of the backlight member 110 by means of the second support base 147. In other words, an upper surface of the second support base 147 protruding outwards from the outer wall 146 of the bottom is connected with or in contact with an area of a lower surface of the backlight member 110 around the first through hole 111. As illustrated in FIG. 5, the first through hole 111 may be a through hole defined by an vertical wall, such that the light guide member 140 may be inserted into the first through hole 111 from bottom to top during assembling.

In some embodiments, the second support base 147 may be fixedly connected with the backlight member 110 by means an optical glue or a connector. In addition, the second support base 147 may be integrally molded to the outer wall 146 of the light guide member 140.

By adopting the embodiments illustrated in FIG. 4 and FIG. 5, the manufacturing difficulty of the backlight member 110 and the light guide member 140 can be reduced, hence facilitating the mass production and increasing the yield rate.

As such, the liquid crystal display provided in the embodiment of the present disclosure can provide a backlight source for the liquid crystal module 120 corresponding to the first through hole 111 by using the light emission member 150 and the light guide member 140 having the first light emergent surface 143, thereby further contributing to the realization of the full-screen display effect of the liquid crystal display 100. In addition, the embodiments of the present disclosure may also utilize the second light emergent surface 144 of the light guide member 140, such that the light emitted from the light guide member 140 is projected onto the entire area of the liquid crystal display 100 corresponding to the first through hole 111, so as to help the liquid crystal display to achieve a complete and great display effect.

Figure 6:
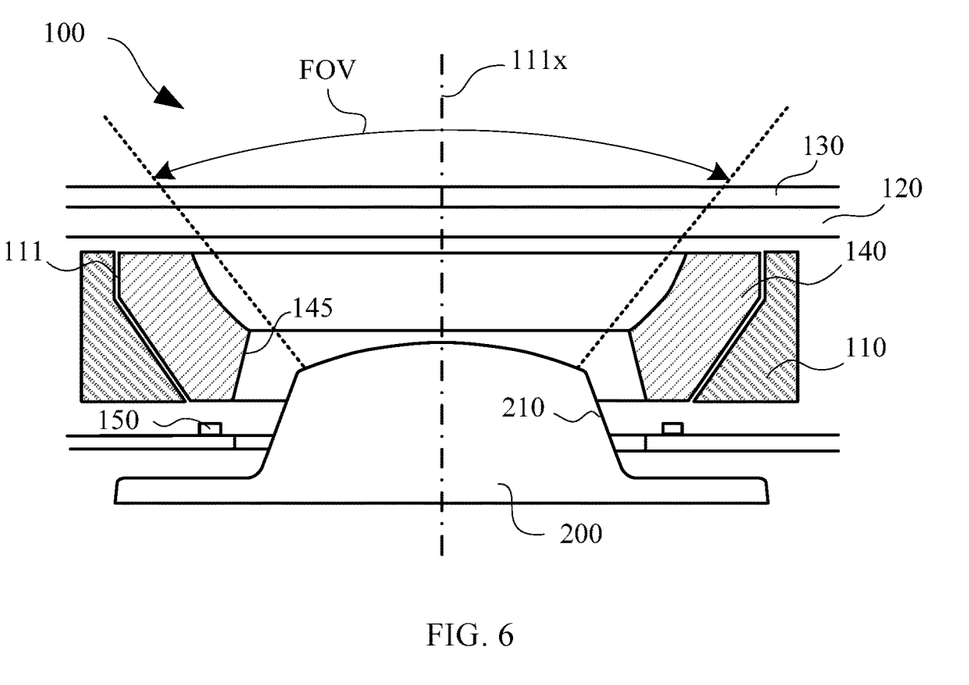
FIG. 6 is a schematic view of a liquid crystal display and a camera in a terminal according to an embodiment of the present disclosure.

FIG. 6 is a partial schematic view of a terminal according to an embodiment of the present disclosure. As illustrated in FIG. 6, the terminal includes a camera 200 and a liquid crystal display 100. The camera 200 is arranged in the second through hole of the light guide 110, and the hole wall surrounding the second through hole is arranged outside a field of view of the camera 200. In this way, the camera 200 will not capture an image of the hole wall surrounding the second through hole when capturing an image, hence ensuring the quality of the image captured by the camera.

Embodiments of the present disclosure do not specifically limit the type of the terminal. For example, the terminal may be a mobile phone, a tablet, or a wearable device. The terminal provided by the embodiments of the present disclosure takes into account the full-screen display effect of the liquid crystal display 100 and the image-capturing function of the camera 200, and thus can optimize the user experience, which are illustrated as follows.

When the terminal performs a screen display, the camera 200 is turned off. In this case, the backlight source of the backlight member 110 and the light emission member 150 may be controlled to emit light simultaneously, and the backlight source may be provided for the liquid crystal module 120 corresponding to the first through hole 111 (especially the liquid crystal module 120 corresponding to the center area of the first through hole 111) by using the light emission member 150 and the light guide member 140 having the first light emergent surface 143, thereby further facilitating to achieve the full-screen display effect of the liquid crystal display 100. In addition, the backlight source may also be provided for the liquid crystal module 120 corresponding to the first through hole 111 (especially the liquid crystal module 120 corresponding to the edge area of the first through hole 111) by using the second light emergent surface 144 of the light guide member 140, thereby helping the liquid crystal display to achieve a complete and great display effect.

When the terminal captures the image, the camera 200 is turned on, and the backlight source in the backlight member 110 emits light while the light emission member 150 is turned off. In this way, a part of the liquid crystal display corresponding to the first through hole 111 may be in a light transmitting state, and the light can enter the camera 200 through the first through hole 111 after passing the liquid crystal display 100, thereby achieving the image-capturing function of the camera 200. In some embodiments, as illustrated in FIG. 6, an inner wall of the light guide member 140 may be arranged outside the field of view of the camera 200, so as to prevent the field of view of the camera from being blocked and hence avoid affecting the image-capturing effect. It should be noted that the inner wall of the light guide member 140 may be the hole wall surrounding the second through hole 141. Similarly, an inner wall of the backlight member 110 may be the hole wall surrounding the first through hole 111.

In an embodiment, when the camera 200 is mounted, the camera 200 may be inserted in the light guide member 140 of the liquid crystal display 100, and the light emission member 150 of the liquid crystal display 100 may be arranged around the camera 200. In some embodiments, the camera 200 has a central axis, and the second through hole 141 has the second axis coinciding with the central axis.

In an embodiment, the light emission member 150 may be arranged around the camera 200 to form a light source of a circular distribution, such that the part of the liquid crystal display 100 corresponding to the first through hole 111 has an enough display brightness, thus helping the terminal to achieve a full-screen display effect (such as an even full-screen display effect).

In an embodiment, a size of the camera 200 is gradually decreased in a direction towards the liquid crystal module in the liquid crystal display 100 along the central axis, such that the outer wall of the camera 200 is fitted with the relief surface 145 of the light guide member 140. In this way, by means of the structures of the relief surface and the outer wall of the camera, the structure in which the liquid crystal display is fitted with the camera is tight, thereby optimizing the structural integration of the terminal.

In some embodiments, a radial size of the camera 200 may be gradually decreased from bottom to top. For example, the camera 200 includes an outer side surface 210 arranged obliquely. For example, the outer side surface 210 is opposing the relief surface 145 of the light guide member 140. In this way, the structural integration of the liquid crystal display 100 and the camera 200 can be improved, which ensures the mounting stability and also saves the internal space of the terminal.

Various embodiments of the present disclosure can have one or more of the following advantages. For example, the embodiments of the present disclosure allow the wall surrounding the second through hole to be arranged outside the field of view of the camera, such that the camera will not capture an image of the wall surrounding the second through hole when capturing an image, hence ensuring the quality of the image captured by the camera.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A liquid crystal display, comprising:
   a liquid crystal module;
   a backlight member arranged under the liquid crystal module and having a first through hole;
   a light guide member arranged in the first through hole and having a second through hole, the light guide member comprising a light incident surface and a first light emergent surface on a wall surrounding the second through hole, and the first light emergent surface being obliquely arranged towards the liquid crystal module; and
   a light emission member arranged opposing the light incident surface and configured to emit light into the light guide member through the light incident surface, wherein a part of the light entering the light guide member is projected on a portion of the liquid crystal module corresponding to a center area of the first through hole after being emitted from the first light emergent surface.

2. The liquid crystal display according to claim 1, wherein the light guide member further comprises a second light emergent surface arranged on an upper end surface of the light guide member, and the second light emergent surface is connected with an upper end edge of the first light emergent surface; and
   another part of the light entering the light guide member is projected on another portion of the liquid crystal module corresponding to an edge area of the first through hole after being emitted from the second light emergent surface.

3. The liquid crystal display according to claim 1, wherein the light guide member further comprises a relief surface arranged on the wall surrounding the second through hole and below the first light emergent surface.

4. The liquid crystal display according to claim 3, wherein the relief surface is obliquely arranged towards a lower part of the second through hole.

5. The liquid crystal display according to claim 1, wherein the upper end surface of the light guide member protrudes out of the first through hole.

6. The liquid crystal display according to claim 1, wherein the light emission member is arranged below the light guide member, and the light incident surface is arranged on a lower end surface of the light guide member.

7. The liquid crystal display according to claim 1, wherein the first through hole has a first axis, and the second through hole has a second axis coinciding with the first axis.

8. The liquid crystal display according to claim 7, wherein a distance between the first light emergent surface and the second axis increases gradually in a direction towards the liquid crystal module along the second axis.

9. The liquid crystal display according to claim 8, wherein the first light emergent surface comprises an inwardly concave curved surface.

10. The liquid crystal display according to claim 7, wherein the second light emergent surface of the light guide member is perpendicular to the second axis and extends to an edge of the first through hole.

11. The liquid crystal display according to claim 7, wherein the light incident surface comprises an annular light incident surface perpendicular to the second axis.

12. The liquid crystal display according to claim 11, wherein the light emission member comprises at least two light emission members distributed in a circumferential direction of the annular light incident surface.

13. The liquid crystal display according to claim 7, wherein
   a wall surrounding the first through hole comprises a vertical wall at an upper end of the first through hole and an inclined wall below the vertical wall;
   an outer wall of the light guide member comprises a first portion fitted with the vertical wall and a second portion fitted with the inclined wall; and
   a distance between the inclined wall and the first axis decreases gradually in a direction towards a lower part of the first through hole along the first axis.

14. The liquid crystal display according to claim 1, wherein the backlight member further comprises a first support base configured to carry the light guide member, and the first support base extends from a wall surrounding a bottom of the first through hole towards an interior of the first through hole.

15. The liquid crystal display according to claim 1, wherein the light guide member further comprises a second support base in contact with a bottom of the backlight member, and the second support base protrudes outwards from an outer wall of a bottom of the light guide member.

16. The liquid crystal display according to claim 1, wherein an optical isolation layer is arranged between an outer wall of the light guide member and a wall surrounding the first through hole.

17. A mobile terminal comprising the liquid crystal display according to claim 1, further comprising a camera, wherein
   the wall surrounding the second through hole is arranged outside a field of view of the camera, such that the camera does not capture an image of the wall surrounding the second through hole when capturing an image, thereby ensuring quality of the image captured by the camera; and
   liquid crystal in a liquid crystal layer of the liquid crystal module is configured to be reversed under control of an electrode assembly in the liquid crystal module to have an area of the liquid crystal display corresponding to the first through hole realize image display, thereby achieving a full-screen display effect.

18. A terminal, comprising a camera and a liquid crystal display, wherein the liquid crystal display comprises:
   a liquid crystal module;
   a backlight member arranged under the liquid crystal module and having a first through hole;
   a light guide member arranged in the first through hole and having a second through hole, the light guide member comprising a light incident surface and a first light emergent surface on a wall surrounding the second through hole, and the first light emergent surface being obliquely arranged towards the liquid crystal module; and
   a light emission member arranged opposing the light incident surface and configured to emit light into the light guide member through the light incident surface, wherein a part of the light entering the light guide member is projected on a portion of the liquid crystal module corresponding to a center area of the first through hole after being emitted from the first light emergent surface, wherein the camera is arranged in the second through hole of the light guide member, and the wall surrounding the second through hole is arranged outside a field of view of the camera.

19. The terminal according to claim 18, wherein
the camera has a central axis, and the second through hole has a second axis coinciding with the central axis; and
a size of the camera is gradually decreased in a direction towards the liquid crystal module along the central axis.

20. The terminal according to claim 18, wherein the light emission member surrounds the central axis and is arranged around the camera.

* * * * *